United States Patent [19]

Muzslay

[11] Patent Number: 5,230,032

[45] Date of Patent: Jul. 20, 1993

[54] ABUTTING TIPS FIBER OPTIC CONNECTOR AND METHOD OF MAKING SAME

[75] Inventor: Steven Z. Muzslay, Huntington Beach, Calif.

[73] Assignee: ITT Corporation, Secaucus, N.J.

[21] Appl. No.: 689,064

[22] PCT Filed: May 9, 1991

[86] PCT No.: PCT/US91/03248

§ 371 Date: Jun. 11, 1991

§ 102(e) Date: Jun. 11, 1991

[51] Int. Cl.$^5$ ............................................ G02B 6/26

[52] U.S. Cl. .............................. 385/66; 385/56; 385/78; 385/81; 385/84; 385/139

[58] Field of Search ............ 385/66, 56, 76, 77, 385/78, 81, 84, 139

[56] References Cited

U.S. PATENT DOCUMENTS

| | | | |
|---|---|---|---|
| 4,140,367 | 2/1979 | Makuch et al. | 385/59 X |
| 4,178,068 | 12/1979 | Hoover | 385/78 X |
| 4,208,092 | 6/1980 | Monaghan et al. | 385/55 X |
| 4,252,406 | 2/1981 | Ryan, Jr. et al. | 385/66 X |
| 4,418,983 | 12/1983 | Bowen et al. | 385/81 X |
| 4,435,036 | 3/1984 | Sasakawa | 385/81 X |
| 4,516,829 | 5/1985 | Borsuk et al. | 385/78 X |
| 4,568,145 | 2/1986 | Colin et al. | 385/75 X |
| 4,605,281 | 8/1986 | Hellewell | 385/70 X |
| 4,616,900 | 10/1986 | Cairns | 385/73 X |
| 4,681,398 | 7/1987 | Bailey et al. | 385/84 X |
| 4,687,288 | 8/1987 | Margolin et al. | 385/84 X |
| 4,696,537 | 9/1987 | Bauer et al. | 385/81 X |
| 4,735,480 | 4/1988 | Levinson et al. | 385/58 X |
| 4,747,658 | 5/1988 | Borsuk et al. | 385/78 X |
| 4,762,386 | 8/1988 | Gordon et al. | 385/84 |
| 4,779,952 | 10/1988 | Hayashi et al. | 385/66 X |
| 4,781,429 | 11/1988 | Cartier | 385/84 X |
| 4,787,701 | 11/1988 | Stenger et al. | 385/70 X |
| 4,789,218 | 12/1988 | Paul et al. | 385/58 X |
| 4,804,243 | 2/1989 | Borsuk et al. | 385/76 X |
| 4,884,864 | 12/1989 | Ellis et al. | 385/58 X |
| 4,936,662 | 6/1990 | Griffin | 385/77 X |
| 4,964,690 | 10/1990 | Lappohn et al. | 385/58 X |
| 4,969,924 | 11/1990 | Suverison et al. | 385/78 X |
| 5,091,987 | 2/1992 | MacCulloch et al. | 385/66 |
| 5,091,990 | 2/1992 | Leung et al. | 385/81 |
| 5,101,463 | 3/1992 | Cubukciyan et al. | 385/72 |
| 5,104,243 | 4/1992 | Harding | 385/84 |
| 5,134,677 | 7/1992 | Leung et al. | 385/84 |

FOREIGN PATENT DOCUMENTS

| | | | |
|---|---|---|---|
| 2493538 | 11/1980 | France | 385/66 X |
| 0076045 | 6/1978 | Japan | 385/56 X |

*Primary Examiner*—Brian Healy
*Attorney, Agent, or Firm*—Thomas L. Peterson

[57] ABSTRACT

An optical fiber connection system is provided, of the type wherein the front tips (30, 32, FIG. 2) of two optical fibers substantially abut one another, which precisely aligns the two fiber tips while keeping them pressed together, in a low cost plastic construction. Each connector of a mating pair includes an optical fiber assembly (24, 26) mounted in a housing, the assembly including a forward ferrule (40, 42) crimped to the front end portion of a fiber. One connector housing has an alignment sleeve (70) lying about the forward ferrule of that connector, the sleeve having slots forming tines (80-84) with free front ends extending forward of the corresponding ferrule (40). The other connector housing has a tine deflector (96) that deflects the free front ends of the tines against the front ends of the substantially abutting ferrules. One of the optical fiber assemblies includes a rear ferrule (50) fixed to the fiber at a location spaced rearward of the forward ferrule (44), with the rear ferrule held against rearward sliding movement while the front ferrule can slide rearwardly to cause the fiber portion (36A) between the ferrules to bend or bow to accommodate the reduced space between the ferrules.

15 Claims, 4 Drawing Sheets

ABUTTING TIPS FIBER OPTIC CONNECTOR AND METHOD OF MAKING SAME

BACKGROUND OF THE INVENTION

One common way to connect a pair of optical fibers is to hold their ends in substantial abutment and in precise alignment. Precise alignment can be achieved by providing a sleeve with an accurate internal cylindrical surface that closely receives ferrules attached to the ends of the two fibers, to guide one ferrule in slidable movement along the sleeve until the tips of the fibers substantially abut. U.S. Pat. No. 4,140,367 by Makuch describes a connector system of this type. The alignment sleeve must be accurately formed, as by machining, and is not conducive to manufacture by injection molding of plastic. Another approach, described in U.S. Pat. No. 4,964,690 by Lappohn describes an arrangement where an alignment sleeve that slidably receives ferrules attached to the ends of the two fibers that are to abut, has a middle sleeve portion with slits, with the areas between the slits being compressed inwardly against the two ferrules to align them. The slitted sleeve portion must be of considerable length to enable its inner surface between the slits, to remain substantially cylindrical despite being inwardly bowed to press against the ferrules. The ferrules are biased against one another by springs which require one of the optical fibers to be slidable into and out of the rear end of the ferrule, which prevents fixing the rear end of the ferrule relative to the connector housing.

While prior optical fibers used glass cores which were very thin, such as three thousandth inch in diameter, a more recent approach is to use plastic fibers with a much larger light-transmitting core of a diameter such as one millimeter (about 39 thousandths inch). Such plastic fibers enable the use of low cost connectors with important parts formed by plastic molding injection. However, plastic injection molding generally results in parts of less precision than those obtained by machining of metal. A fiber optic connector system which was relatively compact, which assured accurate alignment of substantially abutting optical fibers despite substantial tolerances in the manufacture of connector parts, and which avoided the need for the rear ends of the optical fibers to slide relative to the connectors, would be of considerable value.

SUMMARY OF THE INVENTION

In accordance with one embodiment of the present invention, an optical fiber connector system is provided, which enables precision alignment of substantially abutting optical fibers in connectors of moderate cost and which enables the optical fiber portions extending rearward of the connectors to lie stationary with respect to the connector housings. Each connector includes an optical fiber assembly that can include a ferrule held around the front end of the fiber as by crimping. A first connector housing has an alignment sleeve with slots dividing the front portion of the sleeve into tines that have free front ends. The second connector housing forms a tine deflector that deflects the free ends of the tines radially inwardly against the outside of both ferrules to thereby accurately align the ferrules. The inner surfaces of the tine preferably initially extend at a slight taper, and each tine preferably has an elongated projection that engages the ferrules in substantially line contact.

The optical fiber assembly of one of the connectors includes a rearward ferrule fixed to the optical fiber at a location spaced rearward of the forward ferrule, to leave a considerable length of optical fiber between them that can bow slightly. The rear ferrule is held against rearward deflection, but the forward ferrule can slide rearwardly when the optical fiber tips abut each other, with the shortening of distance between the ferrules taken up by bowing of the optical fiber. A coil spring can surround the optical fiber portion lying between ferrules to bias the ferrules apart.

The novel features of the invention are set forth with particularity in the appended claims. The invention will be best understood from the following description when read in conjunction with the accompanying drawings.

DESCRIPTION OF THE PREFERRED EMBODIMENT

Figure 1:
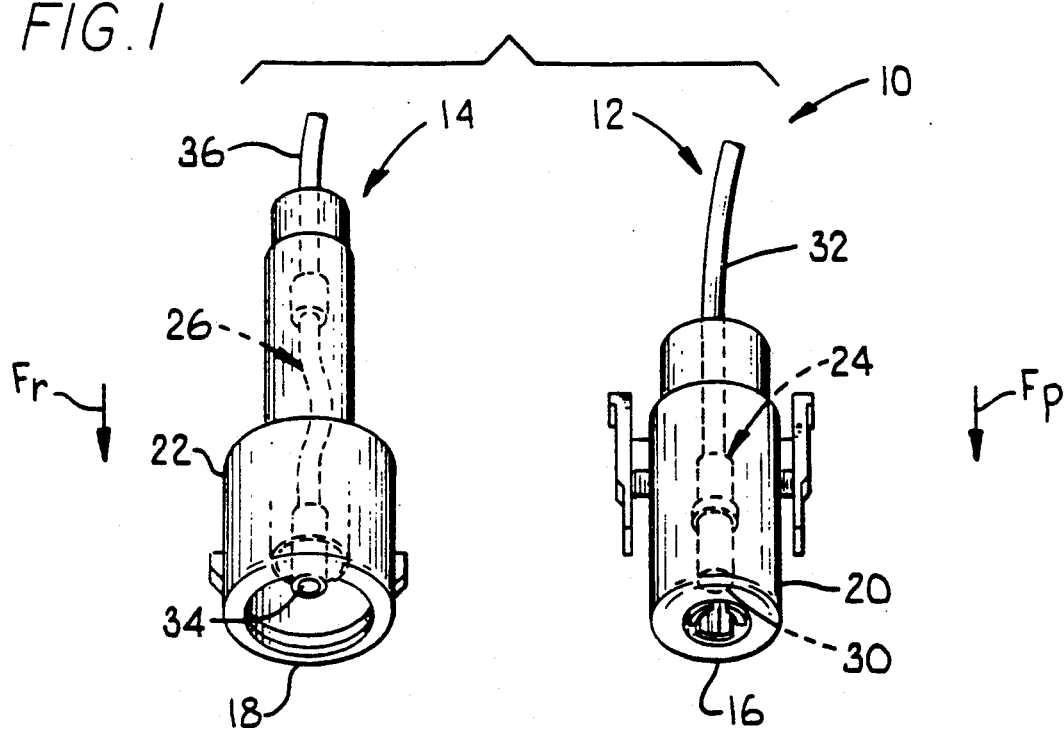
FIG. 1 is a perspective view of an optical fiber connector system constructed in accordance with the present invention, showing the plug and receptacle connector spaced apart.

FIG. 1 illustrates an optical fiber connector system 10 which includes plug and receptacle connectors 12, 14 that each has a front end 16, 18, and that can mate by moving each connector in a forward direction $F_p$, $F_r$ towards each other. Each connector includes a housing 20, 22 and an optical fiber assembly 24, 26 mounted in the housing. When the connectors are mated, the front tip 30 of the optical fiber 32 of the plug optical fiber assembly, substantially abuts the front tip 34 of the optical fiber 36 of the receptacle optical fiber assembly. It is not necessary that the tips of large diameter (e.g. 1 mm) optical fiber touch each other, although the tips should substantially abut by lying very close (e.g. within 0.1 mm) for good coupling.

Figure 2:
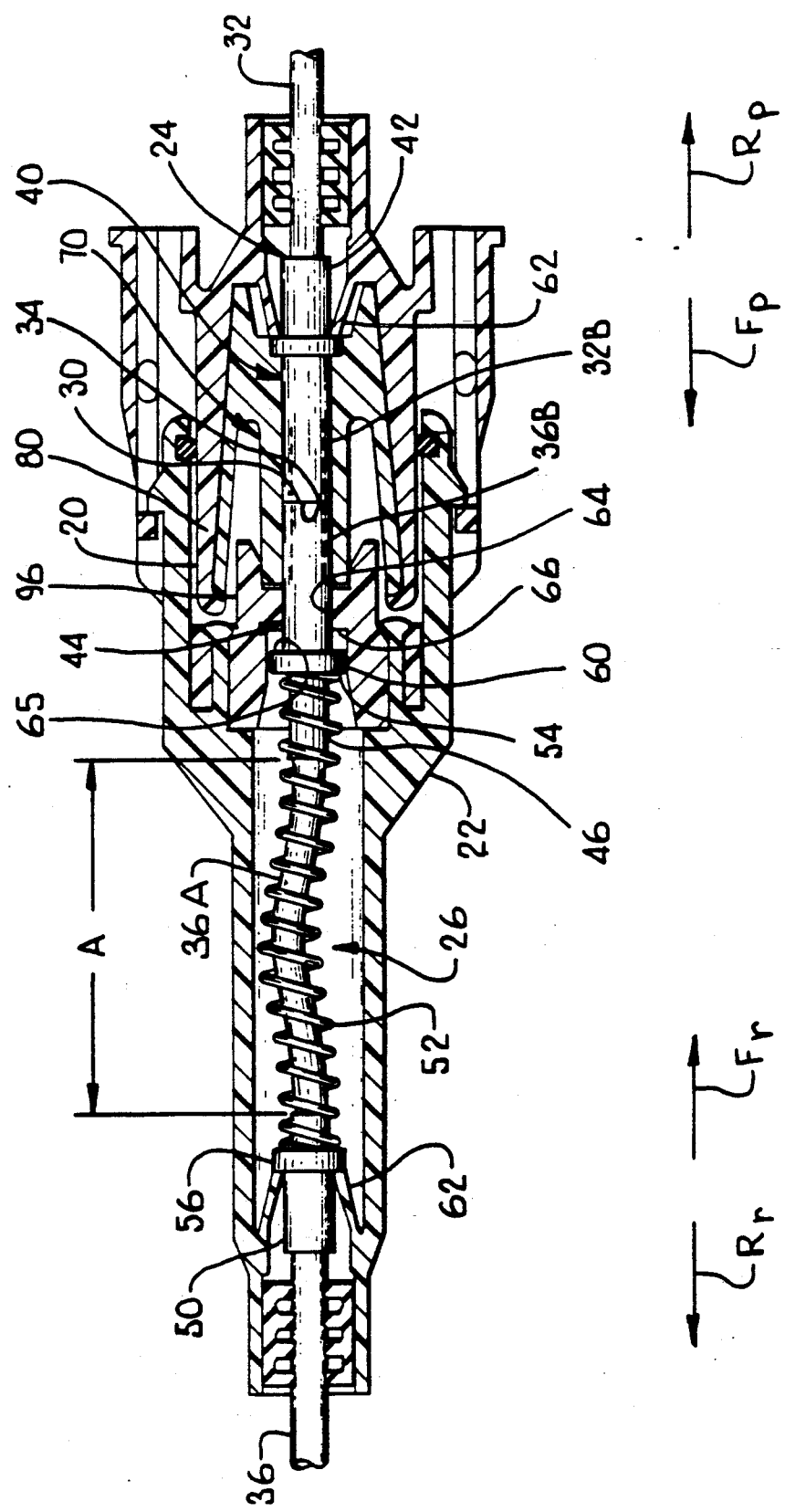
FIG. 2 is a sectional side view of the connector system of FIG. 1, with the connectors fully mated.

As shown in FIG. 2, the plug optical fiber assembly 24 includes a forward ferrule 40 surrounding the optical fiber 32 and firmly held or attached to it, as by crimping a rearward portion 42 of the ferrule to the fiber. The receptacle optical fiber assembly 26 includes a forward ferrule 44 held or attached to the fiber 36 as by crimping a rearward portion 46 thereof to the fiber. The fiber assembly 26 also includes a rear ferrule 50 that is crimped to the fiber at a distance A rearward of the forward ferrule, to leave a long portion 36A of optical fiber between them. The assembly includes a coil spring 52 which has opposite ends bearing against shoulders 54, 56 formed by flanges 60, 62 formed respectively on the forward and rear ferrules.

The rear ferrule 50 of the receptacle optical fiber assembly is prevented from rearward movement in the direction Rr by a retainer 62 that is part of the receptacle housing 22. The forward ferrule 44 of the receptacle fiber assembly is able to slide rearwardly and forwardly in the directions Rr and Fr within a guideway 64 formed in the receptacle housing. The spring 52 and resilience of the optical fiber urges the forward ferrule in the forward direction, until a forwardly-facing shoulder 65 on the ferrule abuts a rearwardly-facing shoulder 66 on the housing. The forward ferrule 44 is able to move rearwardly when the front tip 30 of the receptacle fiber 36 is abutted by the front tip 34 of the plug fiber 32.

Figure 4:
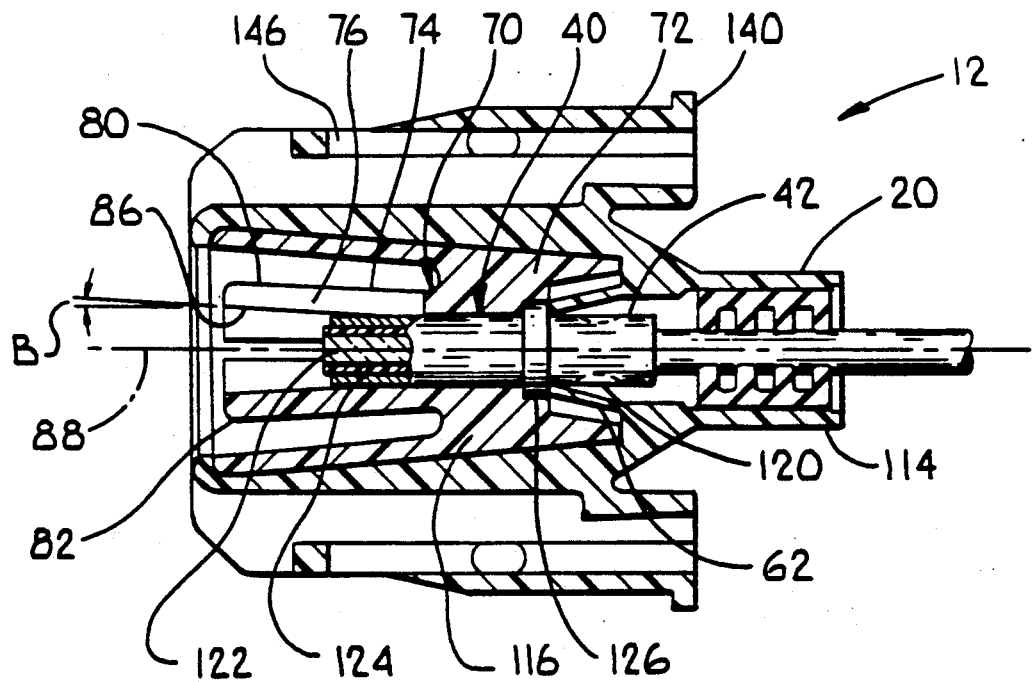
FIG. 4 is a sectional side view of the plug connector of FIG. 2.
Figure 7:
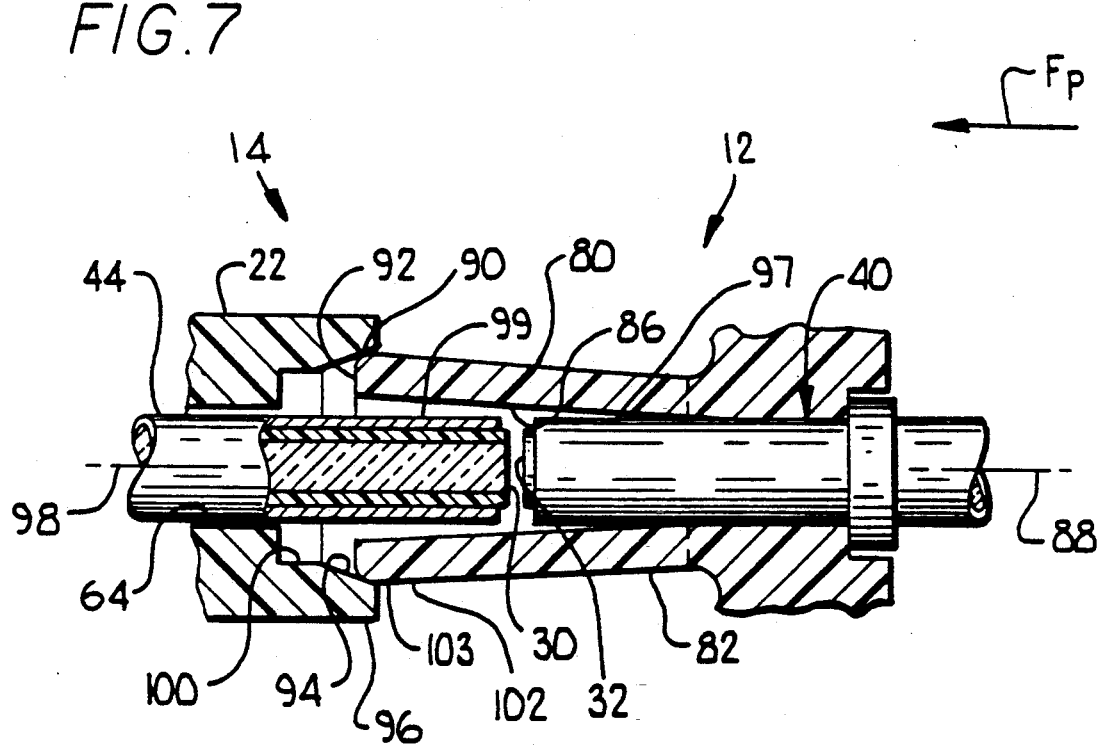
FIG. 7 is an enlarged view of the connector system of FIG. 2, shown at the beginning of tine deflection.

The connectors are mated by inserting a forward portion of the plug housing 20 into a forward portion of the receptacle fiber 22. During such insertion, the tips 30, 34 of the two fibers abut one another, with the tip 30 of the receptacle fiber moving slightly in the direction Rr. The front ends 32B, 36B of the two fibers must be very accurately aligned in order to effectively couple the two fibers so that a very high proportion of light in one of them passes into the other. Such alignment is achieved by an alignment sleeve portion, or sleeve 70 of the plug housing. As shown in FIG. 4, the alignment sleeve 70 includes a rearward portion 72 that surrounds the ferrule 40, but with a slight gap between them that permits slight tilt of the ferrule. The forward portion 74 of the sleeve has three slits or slots 76 that divides it into three tines 80–84. The inner surface 86 of the sleeve forward portion, preferably has a taper in its undeflected orientation, as molded, with the taper making progressively more forward portions of the tine inner surfaces of greater diameter. This results in each tine inner surface extending at an incline angle B from the axis 88 of the plug. FIG. 7 shows portions of the plug and receptacle as they approach each other during mating. Initially, the radially outer portions 90 of the tine tips engage a tine-engaging surface 94 of a tine deflector 96 of the receptacle housing. Further forward movement in the direction Fp of the plug results in radially inward deflection of the tines, until the inner surfaces 86 of the tines press against the outside of the ferrule forward portions 97, 99 to accurately align the forward portions of the two ferrules, and therefore to accurately align the tips 30, 32 of the two optical fibers.

Accurate alignment of the forward portions 97, 99 of the two ferrules is achieved because the inner surface 86 of each tine extends in substantially a straight line, at least at the portions thereof that engage the forward portions of the ferrules. It is relatively easy to form substantially straight lines on injection molded plastic parts or other parts, with high accuracy. As a result, with the straight inner surfaces of the tines pressing radially forward portions 97, 98 of both ferrules at three locations spaced about the ferrules, alignment of the two ferrules at each of the three locations spaced about them is accurately achieved. At least the receptacle forward ferrule 44 can shift radially slightly in its slide guideway 64, to position the front ferrule portions in accurate alignment. Applicant forms the tines so in their undeflected positions, their inner surfaces extend at a small angle B (FIG. 4) such as 3° from parallelism with the axis 88 of the plug. The fact that tines have to undergo only a small deflection results in accurate deflection of the tines.

Applicant prefers to form the tine deflector 96 with a substantially cylindrical rearward portion 100 for closely receiving the deflected tines. While the tapered tine-engaging surface 94 may not deflect all tines radially inwardly by the same amount at the same time, as due to the outer portion 90 of the tip of one tine being slightly more rounded than that of another, the cylindrical rearward surface 100 of the tine deflector can be formed accurately cylindrical, as can the outside surface 102 of the forward ends 103 of the tines. This assures that when the tines are fully deflected and their forward ends lie within the cylindrical rearward portion 100 of the deflector, that all three tines will be substantially equally deflected to very closely surround the forward portions of the two ferrules.

Figure 8:
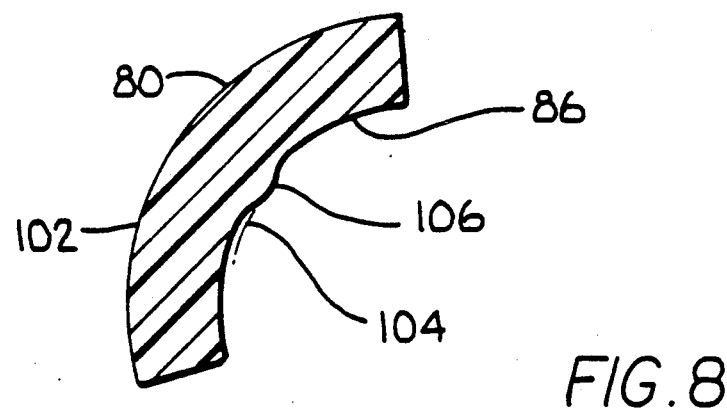
FIG. 8 is a sectional view of one of the tines of FIG. 7.

It would be possible to form the inner surfaces of the ferrules so they were cylindrical. However, as shown in FIG. 8, applicant prefers to form a protuberance 104 on the inner surface 86 of each tine. The protuberance 104 is of constant cross section along at least the forward portions of the tines, and preferably along the entire length of the alignment sleeve. The protuberance 104 provides a narrow innermost part 106 which engages the ferrule in substantially line contact therewith. It is easier to form the tines so that the innermost parts 106 extend along a line, than to form the entire inside surface of the tines so they lie precisely on a cylinder of the same diameter as the outside of the ferrules, and will not become warped. It may be noted that the tines have a relatively short length, about equal to three times the diameter of each ferrule forward portion. The resilience of the tines which have free forward ends, enable such relatively short tines to be used while assuring that when deflected they will lie very closely about the forward ends of the two ferrules.

Figure 3:
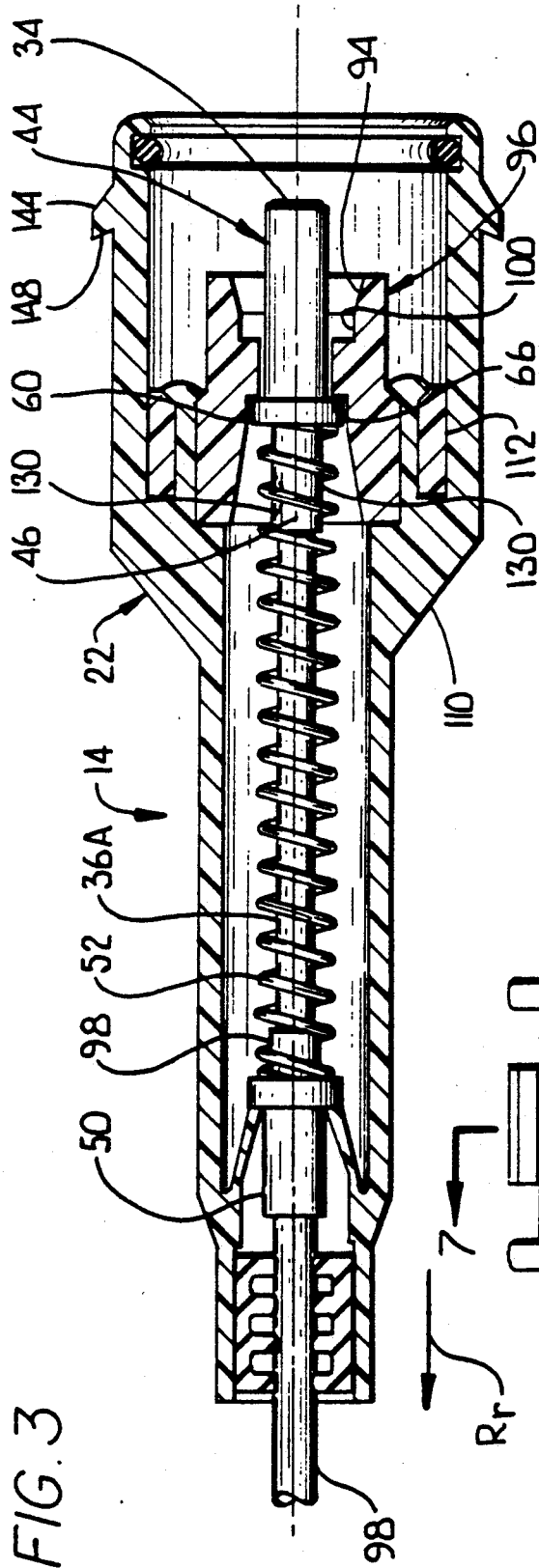
FIG. 3 is a sectional side view of the receptacle connector of the system of FIG. 2.
Figure 5:
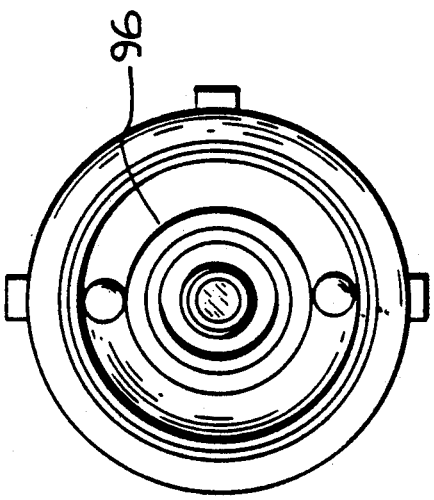
FIG. 5 is a front end view of the receptacle connector of FIG. 3.
Figure 6:
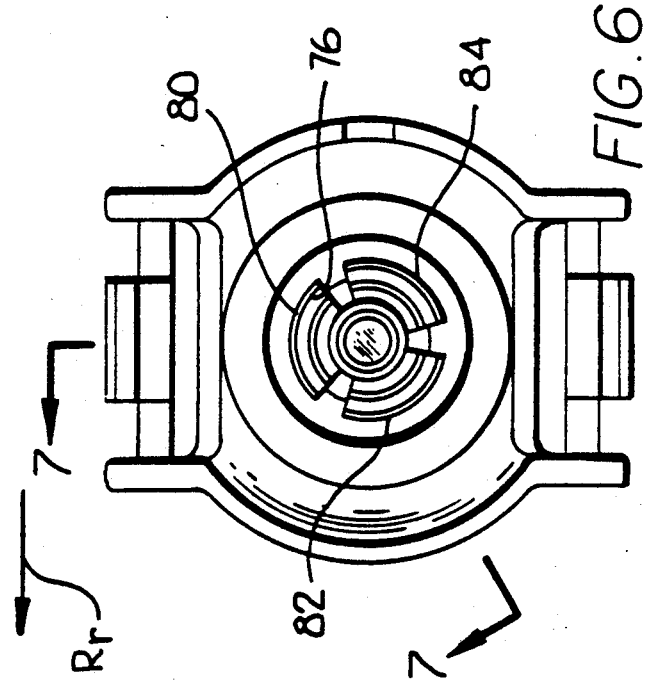
FIG. 6 is a front end view of the plug connector of FIG. 4.

As shown in FIG. 3, the flange 60 on the receptacle forward ferrule 44 initially abuts the shoulder 66 on the receptacle housing. When the tip 34 of the optical fiber abuts the tip of the plug fiber, the forward ferrule 60 moves slightly rearwardly. Such rearward movement results in the fiber portion 36A which extends between the forward and rearward ferrules 44, 50, bowing away from the axis 98 of the receptacle connector, to accommodate the shortened distance between the ferrules. It is possible to rely upon the resilience of the optical fiber itself, although applicant prefers to provide the coil spring 52 to assure that the front ferrule will be pushed firmly forwardly. It can be seen that the fiber portion 36A is substantially straight when the connectors are not mated as in FIG. 3, and preferably even when they are mated as in FIG. 2; that is, the figures show the deviation of the fiber from a straight line being less than 10 times the diameter of the fiber. Also, the bowed coil is bowed by much less than a 180° loop. It also can be seen in FIG. 2 that the coil spring (52) surrounds the optical fiber closely enough that the spring bows when the fiber bows.

The plug and receptacle housing can be formed by injection molding which, although not resulting in parts as precise as those achieved by machining of metal, results in a much lower cost. It is noted that the receptacle housing 22 (FIG. 3) is preferably formed in two parts, including a main housing part 110 and a tine deflector 96 which is held to the main part by pin parts 112 whose forward ends are staked to retain the tine deflector. The tine deflector 96 is preferably formed of a material of low friction such as of a polypropylene or Teflon, to facilitate sliding movement of the alignment sleeve tines therealong. The plug housing 20 (FIG. 4) is also preferably formed with a main part 114 and a separate sleeve part 116. The ferrules are preferably formed by machining of metal such as brass, with care being taken that the forward portions of all forward ferrules have equal diameters and concentric inner and outer surfaces.

The connector system facilitate attachment of each connector to an optical fiber in the field, in a manner that minimizes the requirement for special tools. To assemble the plug connector (FIG. 4), a workman first cuts the end of an optical fiber. He then inserts the end of the fiber into the ferrule 40 until the tip of the fiber projects slightly therefrom. This is preferably accomplished by crimping the rearward portion 42 of the ferrule at 120 to securely hold the ferrule in place. It is noted that plastic optical fibers commonly include a clear plastic core 122 surrounded by an opaque plastic jacket 124. The workman sands the tip of the fiber to sand away cut marks and to form the tip of the fiber substantially flat. The sanded fiber tip preferably lies even with the front end of the ferrule, so the ferrule assures that the fiber tip will be sanded substantially flat and perpendicular to the fiber axis. A fine sandpaper (e.g. of 600 grit or finer) may be used for final sanding of the tip of the fiber. The fiber with the ferrule thereon, is then inserted into the rear of the plug housing 20, until the retention fingers 62 abut the rear of the ferrule flange 126. The plug connector is then completely assembled.

The receptacle connector 14 (FIG. 3) can be assembled by slipping the ferrules 50, 44 onto the fiber, with the spring 52 between them. The forward ferrule 44 is held to the fiber by crimping the rearward portion 46 of the ferrule onto the fiber at a crimp 130. The rear ferrule is slid forwardly, preferably to a position wherein the fiber portion 36A is very slightly bowed, and then is crimped onto the fiber. It is possible to crimp the rear ferrule at a position wherein the optical fiber is not initially bowed, but initial slight bowing is preferred to facilitate additional bowing when the connectors are bated. The workman then sands the receptacle tip of the fiber to make it substantially flat and smooth.

To assemble the connectors, a worker inserts the plug connector into the receptacle connector until a pair of latches 140 on the plug connector fully engage strikes 144 on the receptacle connector, with holes 146 of the latches receiving the strikes and abutting rearward shoulders 148 on the strikes. The connectors are then fully mated. As discussed above, during mating, the tines of the plug connector are inwardly deflected so the inner surfaces of the tines lie very closely about the forward portions of the two ferrules to accurately align them. During such mating, the forward ferrule of the receptacle connector is moved slightly rearwardly.

Figure 9:
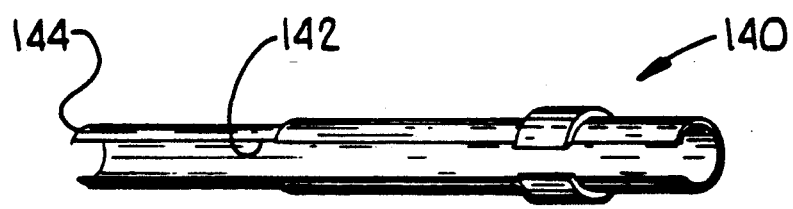
FIG. 9 is an isometric view of a tool that can be used to install and remove optical fiber assemblies from housings of the system of FIGS. 1-8.

About the only tools required to install or disassemble each of the connectors, comprise a crimping tool which is commonly available to linemen who install and repair wires and cables, pieces of ordinary sandpaper, and a very low cost specialized tool shown at 140 in FIG. 9. The tool 140 is a low precision part injection molded of flexible plastic, which has a slot 142 to enable it to be slipped over an optical fiber. The tool 140 can be used to remove the ferrule by pressing the tool so its forward end 144 presses against the tines 62 (FIG. 4) of the retainer to deflect the tines out of the way so the ferrule can be removed. This type of tool and the retainers with which they are used are known in the prior art.

Thus, the invention provides an optical fiber connector system which is compact, of low cost, and can be readily installed in the field. One of the connectors has an alignment sleeve with a forward end extending forward of the ferrule thereof and having slots dividing it into tines with free forward ends. The inner surface of the sleeve at the tines preferably is tapered to be of progressively larger diameter at progressively more forward locations therealong. The other connector has a tine deflector which engages the tips of the tines as the connectors are mated, to deflect the tines radially inwardly until they closely engage the forward ferrules of both connectors. The free forward ends of the tines facilitate their deflection, using tines of relatively short length to facilitate construction of a compact connector. The optical fiber assembly of one of the connectors preferably includes two ferrules attached to the fiber, with the rear ferrule held against rearward movement by the connector housing, and with the forward ferrule being slidable in a rearward direction. Rearward sliding of the forward ferrule is accommodated by bowing of the optical fiber portion extending between the ferrules.

Although particular embodiments of the invention have been described and illustrated herein, it is recognized that modifications and variations may readily occur to those skilled in the art, and consequently it is intended that the claims be interpreted to cover such modifications and equivalents.

I claim:

1. In an optical fiber connector system which includes mating plug and receptacle connectors, each having a housing and an optical fiber assembly in the housing, with each optical fiber assembly including a ferrule with forward and rearward portions wherein the plug and receptacle ferrules are each attached to and surround an end of an optical fiber, the improvement of a mechanism for accurately aligning the ferrules to accurately align the optical fibers, characterized by:

said plug housing has a plastic molded alignment sleeve that closely surrounds the forward portion of said plug ferrule, said alignment sleeve having a plurality of slots dividing a forward portion of said sleeve into a plurality of tines having free forward ends;

said receptacle having a tine deflector with a tine-engaging surface constructed to engage the free forward ends of said tines and deflect them radially inwardly as said plug and receptacle housings are mated, to cause inward tine deflection until said tines closely surround and engage the forward portions of at least said plug ferrule.

2. The connector described in claim 1 wherein:
   the inner surface of said sleeve includes a plurality of radially-inwardly extending protuberances, with one of said protuberances extending along each of said tines to engage forward portions of both the plug and receptacle ferrules, and with the radially innermost edge of each protuberance being narrower than most of the rest of the tine.

3. The connector described in claim 1 wherein:
   said tine deflector has an internally tapered forward part which is of progressively smaller diameter at progressively more rearward locations, and has a substantially cylindrical rearward portion for receiving the front ends of said tines to hold them in fully inwardly-deflected positions.

4. The connector described in claim 1 wherein:

one of said optical fiber assemblies includes a first of said ferrules with said first ferrule fixed to an end of one of said optical fiber, and a second ferrule fixed to the same optical fiber at a location spaced rearward of said first ferrule, said one of said optical fiber assemblies also including a spring biasing said first and second ferrules apart, and the portion of said optical fiber extending between said first and second ferrules being bendable;

one of said connector housings which holds said one of said optical fiber assemblies, has first and second shoulders which respectively abut said first and second ferrules to limit respective forward and rearward movement of said ferrules, with said first ferrule being slidable in said housing relative to said second ferrule, so said first ferrule can be rearwardly deflected during mating of said connectors, with said optical fiber portion bowing to accommodate such first ferrule rearward deflection.

5. In an optical fiber connector system which includes mating plug and receptacle connectors, each having a housing and a optical fiber assembly in the housing with each optical fiber assembly including an optical fiber having a forward end that substantially abuts the forward end of the optical fiber of the other connector when the connectors mate, characterized by:

a first of said optical fiber assemblies includes forward and rearward ferrules that are each fixed to spaced locations along a first of said optical fibers, with said forward ferrule having a forward end lying substantially flush with said fiber forward end;

a first of said housings has spaced portions that respectively support said forward and rearward ferrules, with said rearward ferrule being supported against rearward movement and said forward ferrule being slidably supported in movement toward said rearward ferrule;

the distance between said forward and rearward ferrules being sufficient to permit bowing of the portion of said optical fiber extending between them, but said portion of said fiber being substantially straight when said connectors are not mated, to thereby allow said forward ferrule to be pushed rearwardly closer to said rearward ferrule during mating of said connectors.

6. The system described in claim 5 including:

a coil spring extending between said ferrules and biasing them apart, said spring comprises a coil spring disposed closely about said portion of said optical fiber which extends between said ferrules, so the coil spring bows when the fiber bows, when the connectors mate.

7. A method for mating plug and receptacle connectors that each has a housing and an optical fiber assembly comprising an optical fiber with a forward end and a forward ferrule fixed to the optical fiber end, and with the forward ferrule having an outside surface that is concentric to the optical fiber it surrounds and that lies on an axis of the respective connector, by inserting the plug connector into the receptacle connector until the optical fiber ends substantially abut one another, characterized by:

installing a sleeve having tines with free forward ends, closely about a first of said ferrules;

after said optical fiber ends substantially abut, deflecting said free ends of said tines radially inwardly to press said tines against forward portions of both of said ferrules.

8. A method for mating plug and receptacle connectors that each has a housing and an optical fiber assembly comprising an optical fiber with a forward end having a front tip and a forward ferrule fixed to the optical fiber end, and with the forward ferrule having a front end and having an outside surface that is concentric to the optical fiber it surrounds and that lies on an axis of the respective connector, by inserting the plug connector into receptacle connector until the front tips of the optical fiber ends substantially abut one another, characterized by;

fixing said forward ferrule to a location along said optical fiber so the front tip of the fiber lies substantially even with the front end of said forward ferrule;

installing a rear ferrule on a first of said optical fibers that lies in a first of said connectors, at a location spaced rearward of the forward ferrule on said first fiber, with the portion of fiber between said ferrules being substantially straight;

as said optical fiber ends substantially abut, holding said rear ferrule against rearward movement relative to the rest of said first connector, while allowing said forward ferrule to slide rearwardly, and allowing the entire portion of said first fiber which lies between said rear and forward ferrules to bow slightly away from said axis.

9. An optical fiber connector system comprising:

plug and receptacle connectors, each having an optical fiber assembly which includes an optical fiber with a forward end and a forward ferrule with a forward portion that surrounds and is held to the optical fiber forward end;

a first of said housings includes an alignment sleeve having slots forming a plurality of times with free forward ends, said sleeve closely receiving the forward ferrule of a first of said connectors, with said tine free forward ends extending forward of the forward end of the forward ferrule in said first connector;

the second of said housings having a tine deflector positioned to engage said tines and press them closely around the forward portions of both of said ferrules.

10. The system described in claim 9 wherein:

said sleeve has an axis and is a molded part that is molded with the inner surfaces of said tines diverging in a forward radially outward direction.

11. The system described in claim 9 wherein:

said sleeve has an axis and said tines each includes an inward projection with a narrow radially inner surface that makes substantially line contact with both of said ferrules.

12. The system described in claim 9 wherein:

said tine deflector has a substantially cylindrical rearward surface which is positioned to surround the forward ends of said tines after they have been fully radially inwardly deflected.

13. An optical fiber connector system comprising:

a connector having a housing and an optical fiber assembly;

said optical fiber assembly including an optical fiber with a front end, a forward ferrule surrounding and held to said optical fiber front end, and a rear ferrule surrounding and held to a location on said optical fiber that is spaced rearwardly of said forward ferrule by a distance of a plurality of tines the outside diameter of said optical fiber at the portion thereof lying between said ferrules;

said housing having a shoulder abutting said rear ferrule to prevent its rearward movement, and said housing forming a guideway that slidably supports said forward ferrule in rearward movement, said optical fiber portion lying between said ferrules being unobstructed in bowing as the distance between said ferrules is reduced.

14. The system described in claim 13 wherein:

said rear ferrule has an external flange and has a substantially cylindrical portion of smaller outside diameter than said flange extending forwardly from said flange;

said forward ferrule has an external flange and has a substantially cylindrical portion of smaller outside diameter than said flange thereof, extending rearwardly from said flange; and including a coil spring disposed about the optical fiber portion extending between said ferrules and about said substantially cylindrical ferrule portions, and abutting said flanges, at least when said forward ferrule is pushed to slide rearwardly.

15. In an optical fiber connector system which includes mating plug and receptacle connectors, each having a housing and an optical fiber assembly in the housing with each optical fiber assembly including an optical fiber having a forward end that substantially abuts the forward end of the optical fiber of the other connector when the connectors mate, characterized by:

a first of said optical fiber assemblies includes forward and rearward ferrules that are each fixed to spaced locations along a first of said optical fibers;

a first of said housings has spaced portions that respectively support said forward and rearward ferrules, with said rearward ferrule being supported against rearward movement and said forward ferrule being slidably support in movement toward said rearward ferrule;

the distance between said forward and rearward ferrules being sufficient to permit bowing of the portion of said optical fiber extending between them, to thereby allow said forward ferrule to be pushed rearwardly closer to said rearward ferrule during mating of said connectors;

said plug housing has an alignment sleeve with forward and rearward portions, and the optical fiber assembly of said plug includes one of said ferrules mounted on an optical fiber with the ferrule having a forward portion lying closely within said sleeve;

said sleeve forward portion having a plurality of slots dividing said forward portion into a plurality of tines having free forward ends;

said receptacle housing has an axis and a tine-engaging surface which is shaped to engage the outside of said tine free ends and press them radially inwardly to press their inner surfaces against the inside of said forward ferrule.

* * * * *